(12) United States Patent
Yoon et al.

(10) Patent No.: US 12,388,369 B2
(45) Date of Patent: Aug. 12, 2025

(54) BUCK CONVERTER INCLUDING A BOOTSTRAP CAPACITOR AND AN OPERATING METHOD THEREOF

(71) Applicant: SAMSUNG ELECTRONICS CO., LTD., Suwon-si (KR)

(72) Inventors: Kyeseok Yoon, Yongin-si (KR); Hyebong Ko, Seoul (KR); Jinwoo So, Hwaseong-si (KR); Hyoungseok Oh, Seoul (KR); Daewoong Cho, Yongin-si (KR); Jungwook Heo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 17/891,363

(22) Filed: Aug. 19, 2022

(65) Prior Publication Data

US 2023/0059963 A1   Feb. 23, 2023

(30) Foreign Application Priority Data

Aug. 20, 2021   (KR) .................. 10-2021-0110313

(51) Int. Cl.
*H02M 3/158* (2006.01)
*H02M 1/00* (2007.01)
*H02M 1/08* (2006.01)

(52) U.S. Cl.
CPC ....... *H02M 3/1588* (2013.01); *H02M 1/0006* (2021.05); *H02M 1/08* (2013.01)

(58) Field of Classification Search
CPC ............. H02M 1/0006; H02M 1/0032; H02M 1/0035; H02M 1/08
See application file for complete search history.

(56) References Cited

U.S. PATENT DOCUMENTS

| 7,145,316 B1 | 12/2006 | Galinski, III |
| 8,558,526 B2 | 10/2013 | Ishii |

(Continued)

FOREIGN PATENT DOCUMENTS

| CN | 112152451 | 12/2020 | |
| WO | 2018-097820 | 5/2018 | |
| WO | WO-2018097820 A1 * | 5/2018 | .............. H02M 1/08 |

OTHER PUBLICATIONS

European Search Report issued in corresponding EP Patent Application No. 22191161.3 on Jan. 17, 2023.

*Primary Examiner* — Gustavo A Rosario-Benitez
(74) *Attorney, Agent, or Firm* — Morgan, Lewis & Bockius LLP

(57) ABSTRACT

A buck converter including: a first switching element connecting an input voltage node to a switching node; a second switching element connecting the switching node to a ground node; a low drop out (LDO) voltage regulator connected to the input voltage node; a pulse width modulation (PWM) controller configured to receive a mode signal indicating an operation mode and toggle, in response to the mode signal, a first control signal for turning on the first switching element or a second control signal for turning on the second switching element; a bootstrap charger configured to receive the mode signal and toggle, in response to the mode signal, a third control signal for turning on the second switching element; and a bootstrap capacitor connecting an output node of the LDO voltage regulator to the switching node.

18 Claims, 9 Drawing Sheets

(56) References Cited

U.S. PATENT DOCUMENTS

| | | | |
|---|---|---|---|
| 9,625,932 B2 | 4/2017 | Qu et al. | |
| 9,705,423 B1 | 7/2017 | Micic | |
| 10,333,327 B2 | 6/2019 | Kinzer et al. | |
| 10,511,225 B1 * | 12/2019 | de Marco | H02M 3/157 |
| 2013/0293214 A1 | 11/2013 | Chang et al. | |
| 2015/0061611 A1 * | 3/2015 | Li | H02M 3/1588 |
| | | | 323/235 |
| 2015/0077081 A1 * | 3/2015 | Ejury | H02M 3/158 |
| | | | 327/109 |
| 2017/0133929 A1 * | 5/2017 | Matsuki | H02M 1/32 |
| 2017/0324411 A1 | 11/2017 | Gong et al. | |
| 2018/0041126 A1 | 2/2018 | Zhang | |
| 2019/0341854 A1 | 11/2019 | Kohara | |
| 2020/0266704 A1 * | 8/2020 | Chen | H02M 3/156 |
| 2021/0013808 A1 | 1/2021 | Cattani et al. | |

* cited by examiner

BUCK CONVERTER INCLUDING A BOOTSTRAP CAPACITOR AND AN OPERATING METHOD THEREOF

CROSS-REFERENCE TO RELATED APPLICATION

This application claims priority under 35 U.S.C. § 119 to Korean Patent Application No. 10-2021-0110313, filed on Aug. 20, 2021, in the Korean Intellectual Property Office, the disclosure of which is incorporated by reference herein in its entirety.

TECHNICAL FIELD

The inventive concept relates to a buck converter, and more particularly, to a buck converter including a bootstrap capacitor and an operating method thereof.

DISCUSSION OF RELATED ART

As electronic technologies continue to develop, various types of electronic device's have been used. One example is a mobile device such as a smartphone, laptop or wearable. A mobile electronic device may be driven using a battery device included therein. As power consumption of electronic devices has increased, battery capacities have increased, and accordingly, batteries may be charged at various speeds.

SUMMARY

The inventive concept provides a device and method to maintain a voltage level of a bootstrap capacitor based on periodic charging of the bootstrap capacitor.

According to an example embodiment of the inventive concept, a buck converter includes: a first switching element connecting an input voltage node to a switching node; a second switching element connecting the switching node to a ground node; a low drop out (LDO) voltage regulator connected to the input voltage node; a pulse width modulation (PWM) controller configured to receive a mode signal indicating an operation mode and toggle, in response to the mode signal, a first control signal for turning on the first switching element or a second control signal for turning on the second switching element; a bootstrap charger configured to receive the mode signal and toggle, in response to the mode signal, a third control signal for turning on the second switching element; and a bootstrap capacitor connecting an output node of the LDO voltage regulator to the switching node.

According to an example embodiment of the inventive concept, an operating method of a buck converter includes: receiving a mode signal and identifying an operation mode; toggling, based on the operation mode, a first control signal for turning on a first switching element and a second control signal for turning on a second switching element; and toggling a third control signal for turning on the second switching element.

According to an example embodiment of the inventive concept, a buck converter includes: a first switching element connecting an input voltage node to a switching node; a second switching element connecting the switching node to a ground node; a pulse width modulation (PWM) controller configured to receive a mode signal indicating an operation mode and toggle, in response to the mode signal, a first control signal for turning on the first switching element and a second control signal for turning on the second switching element; a bootstrap charger configured to receive the mode signal and toggle, in response to the mode signal, a third control signal for turning on the second switching element; and a bootstrap capacitor connecting the first switching element to the switching node.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept are described in detail with reference to the accompanying drawings.

Figure 1:
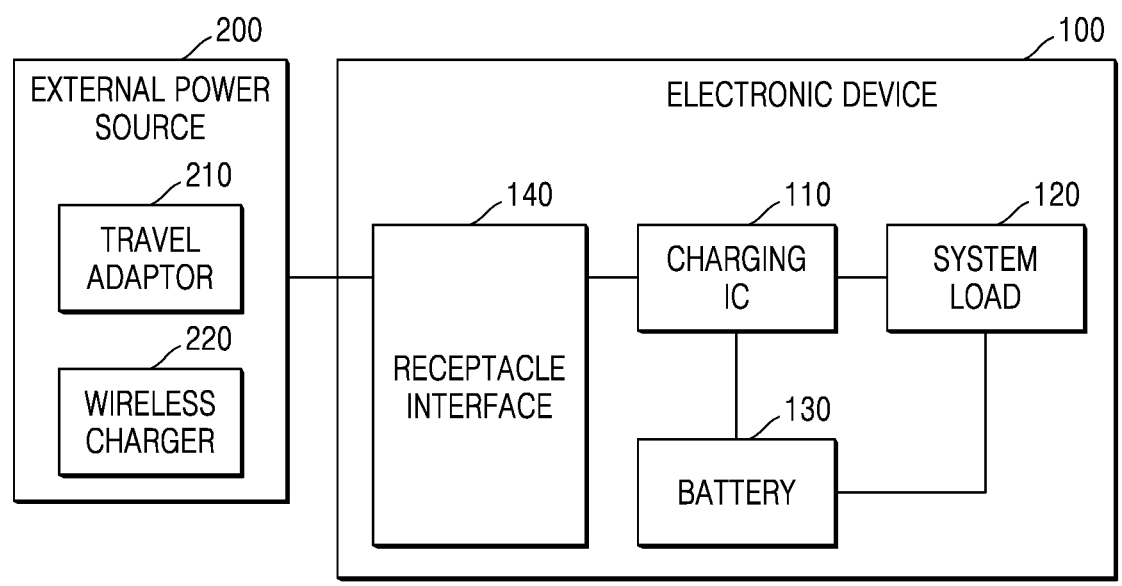
FIG. 1 is a block diagram illustrating an electronic device and an external power source according to an example embodiment of the inventive concept.

FIG. 1 is a block diagram illustrating an electronic device and an external power source according to an example embodiment of the inventive concept.

Referring to FIG. 1, an electronic device 100 and an external power source 200 are shown. To charge a battery 130 included in the electronic device 100, the electronic device 100 and the external power source 200 may be connected to each other in a wired or wireless manner. In other words, the battery 130 may be charged using a wired or wireless charging technique.

In various embodiments of the inventive concept, the electronic device 100 may include various kinds of electronic equipment which a user may carry. For example, the electronic device 100 may be a mobile device such as a smartphone, a tablet personal computer (PC), a cellular phone, a personal digital assistant (PDA), a laptop computer, a wearable device, a global positioning system (GPS) device, an e-book terminal, a digital broadcasting terminal, a Moving Picture Experts Group (MPEG) Audio Layer-3 (MP3) player, or a digital camera. As another example, the electronic device 100 may be an electric vehicle.

The electronic device 100 may include a charging integrated circuit (IC) 110, and the charging IC 110 may be referred as a "battery charger". For example, the charging IC 110 may be implemented by an IC chip and mounted on a printed circuit board (PCB). The charging IC 110 may receive power from the external power source 200, charge the battery 130 by providing the power to the battery 130, and control the electronic device 100 to perform various functions by providing the power to a system load 120. A particular configuration of the charging IC 110 is described below with reference to FIG. 2.

In addition, the electronic device 100 may include the battery 130. The battery 130 may include at least one battery cell. For example, the battery 130 may correspond to a multi-cell battery including a plurality of battery cells connected in series to each other. As another example, the battery 130 may correspond to a single-cell battery including a single battery cell. The battery 130 may receive power through the charging IC 110 when the electronic device 100 is connected to the external power source 200. When the electronic device 100 is not connected to the external power source 200, the battery 130 may provide power to the system load 120 to control the electronic device 100 to perform various functions.

In addition, the electronic device 100 may include the system load 120. The system load 120 may include the components remaining by excluding the charging IC 110 and the battery 130 from the electronic device 100. For example, the system load 120 may include a display, an application processor, a communication processor, a speaker, a memory, and the like. In other words, the system load 120 may include chips, modules, operation blocks, function blocks, and intellectual property (IP) blocks included in the electronic device 100. The system load 120 may receive power from the external power source 200 or the battery 130 and provide various functions to the user. For example, a monitor in the system load 120 may provide visual awareness to the user by displaying an object through the display, the communication processor may transmit and receive data by exchanging a wireless signal with an external device, and the application processor may perform various calculations.

In addition, the electronic device 100 may include a receptacle interface 140. The receptacle interface 140 may connect the electronic device 100 to the external power source 200 via a universal serial bus (USB) cable. In an embodiment of the inventive concept, the receptacle interface 140 may correspond to a USB type-C interface, and the USB cable may correspond to a USB type-C cable. The USB type-C interface may be implemented based on the definition of USB 2.0 or USB 3.1. The receptacle interface 140 may include a plurality of pins. The plurality of pins may include pins for power supply, pins for data transmission, and a configuration channel (CC) pin.

The external power source 200 may supply power to the electronic device 100. According to various embodiments of the inventive concept, the external power source 200 may include a travel adaptor (TA) 210 and a wireless charger 220. The wireless charger 220 may charge the electronic device 100 by wirelessly transmitting power through the air instead of supplying power through a wire. According to various embodiments of the inventive concept, the wireless charger 220 may transmit power based on various wireless charging schemes such as a magnetic induction scheme, a magnetic resonance scheme, an electromagnetic induction scheme, and a non-radiative wireless charging (e.g., WiTricity) scheme.

The TA 210 may supply power through a wire connected to the charging IC 110 in the electronic device 100. The TA 210 may convert household electric power, e.g., alternating current (AC) 110 V to 220 V, or power supplied from another power supply (e.g., a computer) into direct current (DC) power required to charge the battery 130, and provide the DC power to the electronic device 100. According to various embodiments of the inventive concept, the receptacle interface 140 may be electrically connected to an output terminal of an auxiliary battery. According to various embodiments of the inventive concept, the TA 210 may support direct charging. As to be described below, an application processor (121, see FIG. 2) or a direct charger (113, see FIG. 2) may identify whether the TA 210 supports direct charging, by using a resistance value of a CC pin (141, see FIG. 2).

Figure 2:
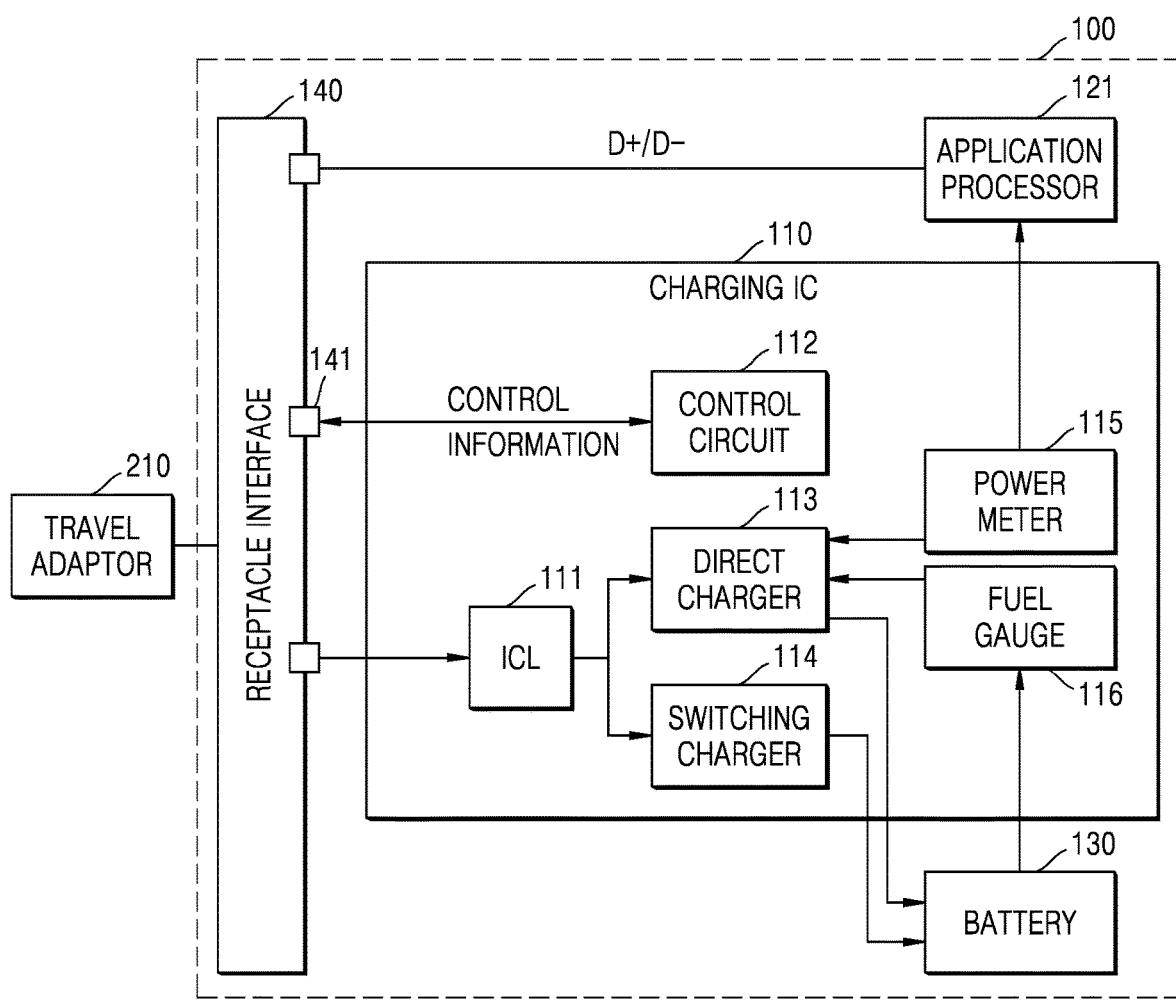
FIG. 2 is a detailed block diagram illustrating a charging integrated circuit according to an example embodiment of the inventive concept.

FIG. 2 is a detailed block diagram illustrating a charging IC according to an example embodiment of the inventive concept.

Referring to FIG. 2, the TA 210 and the electronic device 100 including the charging IC 110 are disclosed. Although FIG. 2 shows that the electronic device 100 is connected to the TA 210, the example embodiment is not limited thereto. For example, the inventive concept is also applicable to an embodiment in which the electronic device 100 is connected to the wireless charger 220 in the external power source 200. In addition, although only the application processor 121 is shown as an example of the system load 120, the inventive concept is not limited thereto.

According to various embodiments of the inventive concept, the charging IC 110 may include a control circuit 112, the direct charger 113, a switching charger 114, an inrush current limiter (ICL) 111, a fuel gauge 116, and a power meter 115.

The ICL 111 may adjust a magnitude of an input current. For example, when the battery 130 is being charged and the system load 120 (in this case, the application processor 121) is also operating at the same time, a magnitude of an input current input to the charging IC 110 may correspond to a sum of a charging current for charging the battery 130 and a load current provided to the system load 120. An increase in the magnitude of the input current may cause an overload of the charging IC 110 and risks such as fire may occur due to the overload. Therefore, the ICL 111 may control the magnitude of the input current so as not to exceed a certain magnitude. The ICL 111 may include an internal transistor resistance. When the magnitude of the input current exceeds the certain magnitude, a magnitude of the internal transistor resistance may be increased in response to a control signal received from the control circuit 112. Because a magnitude of an external power source voltage is constant, the magnitude of the input current may be reduced by increasing the magnitude of the internal transistor resistance.

The control circuit 112 may control a general operation of the charging IC 110. The control circuit 112 may communicate with the TA 210 via the receptacle interface 140. For example, the control circuit 112 may control an output voltage and an output current of the TA 210 by transmitting control information to the TA 210. As another example, the control circuit 112 may identify the connected TA 210 through the CC pin 141.

The switching charger 114 includes a buck converter and may adjust a charging current by stepping down an input voltage and adjusting a cycle of the buck counter. Because the switching charger 114 includes an inductor, switching loss and conduction loss due to a resistance component of the inductor cannot be removed. Therefore, a charging efficiency of the switching charger 114 may be lower than a charging efficiency of the direct charger 113. A particular operation of the buck converter is described below with reference to FIG. 3.

The direct charger 113 may directly provide the input voltage to the battery 130 via a cap (or capacitive) divider. Because the direct charger 113 includes only a transistor and a capacitor, the switching loss and the conduction loss due to the resistance component of the inductor may be saved. The direct charger 113 may be suitable for a highly efficient charging system because the input voltage is directly provided to a node of the battery 130 via the cap divider.

The fuel gauge 116 may sense the battery 130. For example, the fuel gauge 116 may sense a state of charge (SoC) of the battery 130, a charging voltage, a charging current, and a battery temperature. The SoC is a ratio of a current capacity of the battery 130 to a maximum capacity of the battery 130 and may be defined by a unit of percentage (%).

The fuel gauge 116 may include an analog to digital (ADC) converter. The fuel gauge 116 may convert analog information of a sensed voltage, current, and temperature into digital information by using the ADC converter and provide the digital information to the direct charger 113 and/or the application processor 121. The fuel gauge 116 may be implemented as a part of an IC chip and mounted on a PCB. However, the inventive concept is not limited thereto, and the fuel gauge 116 and the charging IC 110 may be implemented by different ICs or IC chips, respectively.

The power meter 115 may acquire information about input and output voltages and currents. The power meter 115 may sense magnitudes of a voltage and a current input to the charging IC 110 and magnitudes of a voltage and a current provided to the system load 120.

The power meter 115 may include an ADC converter, convert analog information of a sensed voltage, current, and power into digital information by using the ADC converter, and provide the digital information to the application processor 121 and/or the direct charger 113. The power meter 115 may be implemented as a part of an IC chip and mounted on a PCB. However, the inventive concept is not limited thereto, and the power meter 115 and the charging IC 110 may be implemented by different ICs or IC chips, respectively.

A mode change from the direct charger 113 to the switching charger 114 may be performed based on information received from the fuel gauge 116 and the power meter 115. The charging IC 110 may further include a circuit or a block supporting at least one of various functions such as an under-voltage lockout (UVLO) function, an over-current protection (OCP) function, an over-voltage protection (OVP) function, a soft-start function for reducing an inrush current, a foldback current limit function, a hiccup mode function for short circuit protection, and an over-temperature protection (OTP) function so as to properly operate in a power saving condition.

Figure 3:
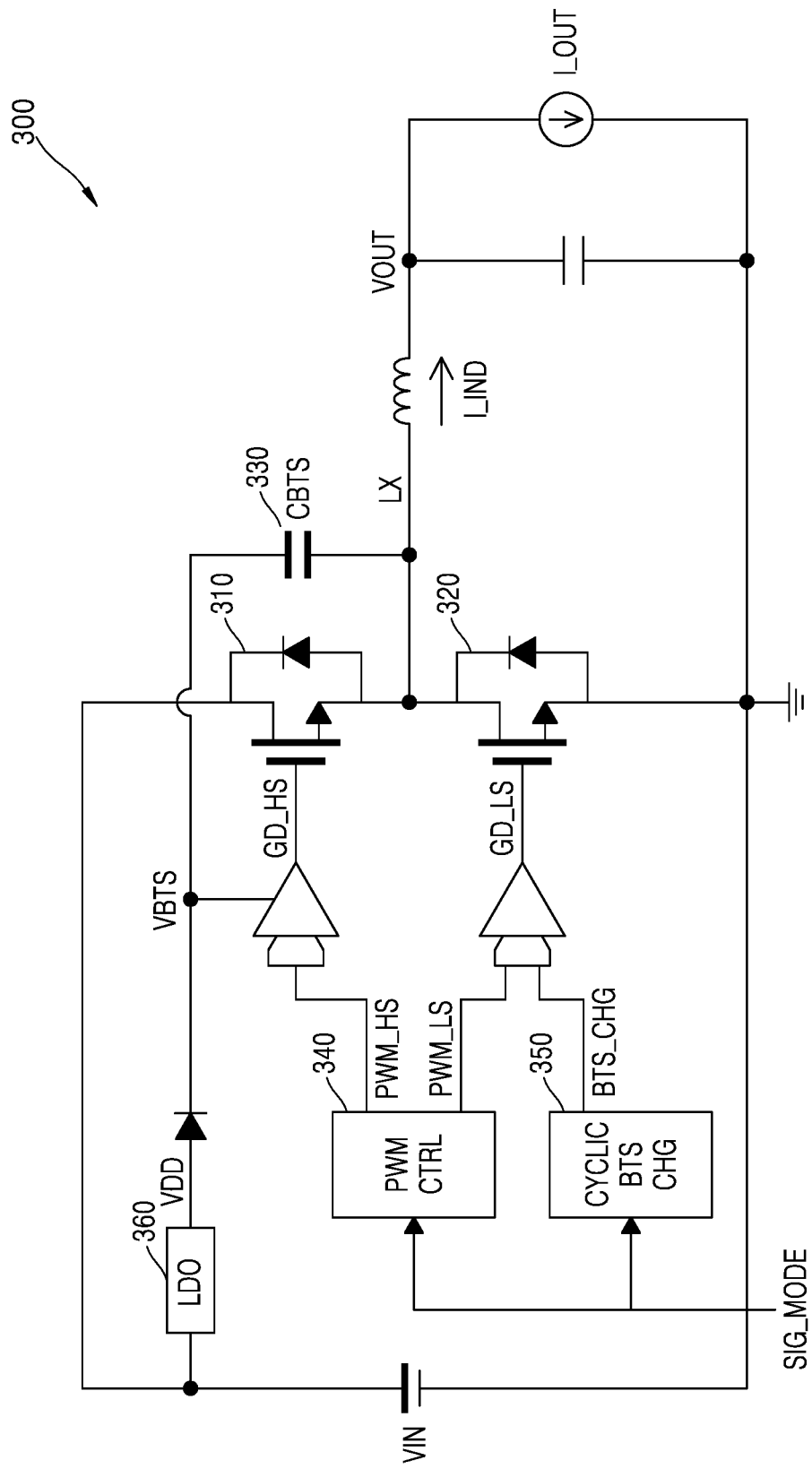
FIG. 3 is a circuit diagram illustrating a buck converter according to an example embodiment of the inventive concept.

FIG. 3 is a circuit diagram illustrating a buck converter 300 according to an example embodiment of the inventive concept.

Referring to FIG. 3, the buck converter 300 may include a first power metal-oxide-semiconductor field-effect transistor (MOSFET) 310, a second power MOSFET 320, a bootstrap capacitor (CBTS) 330, a pulse width modulation (PWM) controller 340, a cyclic bootstrap charger 350, and a low drop out (LDO) voltage regulator 360. The buck converter 300 may further include an inductor connected between a switching node LX and an output voltage node VOUT, a capacitor may be provided between the output voltage node VOUT and a ground node and an output current I_OUT may be provided on a path between the output voltage node VOUT and the ground node. In an example embodiment, the first power MOSFET 310 may connect an input voltage node VIN to a switching node LX, the second power MOSFET 320 may connect the switching node LX to a ground node, the LDO voltage regulator 360 may be connected to the input voltage node VIN, and the bootstrap capacitor 330 may connect an output node of the LDO voltage regulator 360 to the switching node LX. In an example embodiment, the buck converter 300 may not include the LDO voltage regulator 360, and the bootstrap capacitor 330 may connect the first power MOSFET 310 to the switching node LX.

According to an embodiment of the inventive concept, the PWM controller 340 may output a first control signal PWM_HS and a second control signal PWM_LS. A first gate drive signal GD_HS may be a control signal for turning on/off the first power MOSFET 310. For example, the first gate drive signal GD_HS may transit between 0 and 1 based on the first control signal PWM_HS. A second gate drive signal GD_LS may be a control signal for turning on/off the second power MOSFET 320. For example, the second gate drive signal GD_LS may transit between 0 and 1 based on the second control signal PWM_LS or a third control signal BTS_CHG. The second gate drive signal GD_LS may be logic high when either the second control signal PWM_LS and the third control signal BTS_CHG transit to logic high. The PWM controller 340 may adjust an output ratio of the first control signal PWM_HS to the second control signal PWM_LS in response to a mode signal SIG_MODE indicating an operation mode. The first power MOSFET 310 may be referred as an upper switching element, and the second power MOSFET 320 may be referred as a lower switching element. The first power MOSFET 310 may also be referred as a first switching element, and the second power MOSFET 320 may be referred as a second switching element.

For example, the PWM controller 340 may receive a control signal indicating that the operation mode is a pulse skip mode. The pulse skip mode may correspond to a mode of skipping toggling of the first control signal PWM_HS applied to the first power MOSFET 310. In other words, when entering the pulse skip mode, the first control signal PWM_HS may be maintained "logic low". In other words, when entering the pulse skip mode, the first control signal PWM_HS may not be toggled.

As another example, the PWM controller 340 may receive a control signal indicating that the operation mode is an asynchronous mode. The asynchronous mode may be a mode applied so that the first control signal PWM_HS and the second control signal PWM_LS do not alternate. In other words, when entering the asynchronous mode, the first power MOSFET 310 may operate to periodically repeat turning-on and turning-off, while the second power MOSFET 320 maintains being turned-off during the asynchronous mode. In another embodiment of the inventive concept, when entering the asynchronous mode, the second power MOSFET 320 may operate to periodically repeat turning-on and turning-off, while the first power MOSFET 310 maintains being turned-off during the asynchronous mode.

The bootstrap capacitor 330 may boost a voltage to be input to a gate of the first power MOSFET 310. The bootstrap capacitor 330 may further include a diode, wherein the bootstrap capacitor 330 may be instantaneously charged with a voltage to apply a voltage sufficiently greater than a gate-source voltage drop to the gate of the first power MOSFET 310, thereby operating the first power MOSFET 310. According to an embodiment of the inventive concept, the bootstrap capacitor 330 may be connected between a switching node LX and an input voltage node VIN.

The cyclic bootstrap charger 350 may periodically provide the third control signal BTS_CHG to the second power MOSFET 320. The second power MOSFET 320 may be connected to a ground node. The cyclic bootstrap charger 350 may be activated in the asynchronous mode or the pulse skip mode of the operation mode. In the asynchronous mode and the pulse skip mode, because the second control signal PWM_LS for the first power MOSFET 310 is always inactivated, a voltage level VBTS of the bootstrap capacitor 330 may decrease due to a leakage current generated by the bootstrap capacitor 330. To prevent the decrease in the voltage level of the bootstrap capacitor 330, the cyclic bootstrap charger 350 may generate the third control signal BTS_CHG for turning on the second power MOSFET 320 and provide the third control signal BTS_CHG to the second power MOSFET 320 over a pre-defined time period when a control signal indicating the asynchronous mode or the pulse skip mode is applied to the cyclic bootstrap charger 350. The third control signal BTS_CHG may be different from the first control signal PWM_HS and the second control signal PWM_LS.

Figure 4:
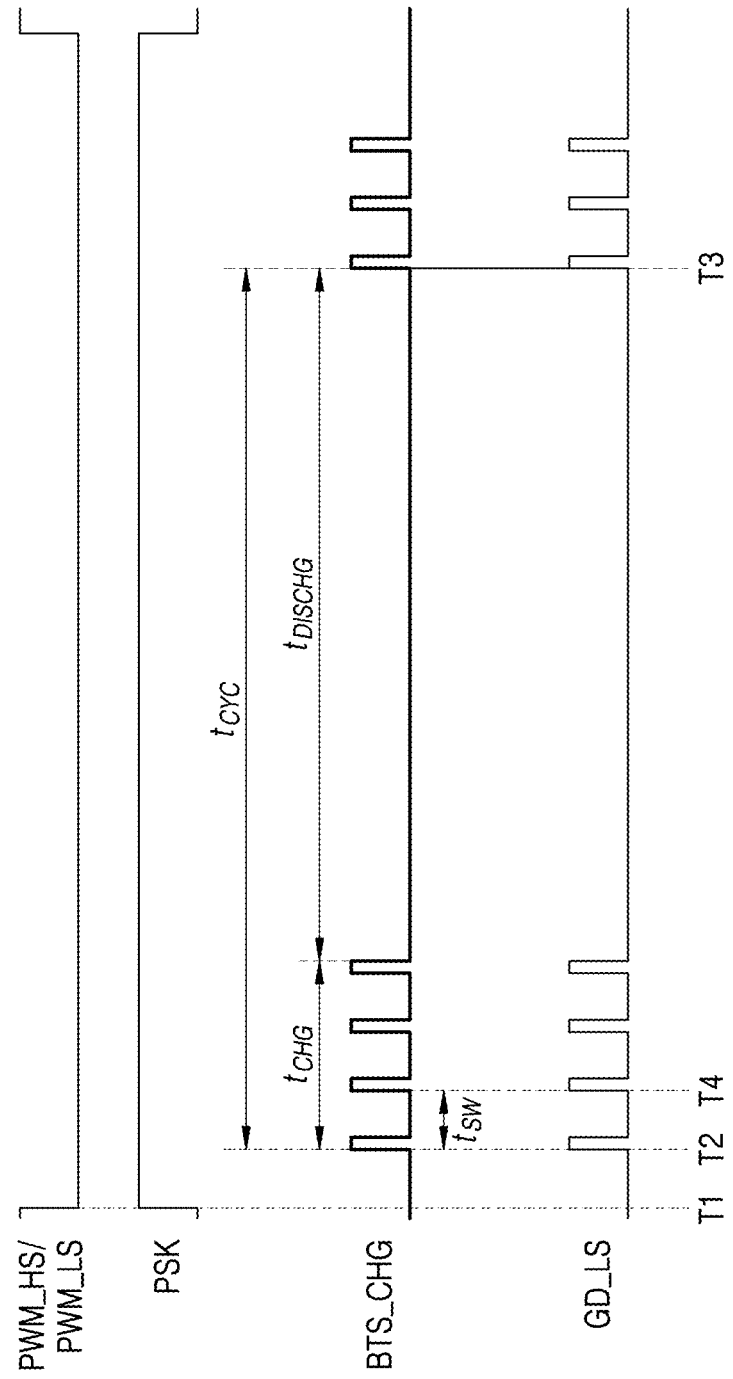
FIG. 4 is a timing diagram illustrating a pulse skip mode according to an example embodiment of the inventive concept.

FIG. 4 is a timing diagram illustrating the pulse skip mode according to an example embodiment of the inventive concept.

Referring to FIG. 4, the PWM controller 340 and the cyclic bootstrap charger 350 may enter the pulse skip mode (PSK high) at a first time point T1. For example, the PWM controller 340 and the cyclic bootstrap charger 350 may receive the mode signal SIG_MODE indicating the pulse skip mode at the first time point T1.

The PWM controller 340 may inactivate the first control signal PWM_HS and the second control signal PWM_LS in response to the mode signal SIG_MODE indicating the pulse skip mode. This is because the PWM controller 340 does not switch the first power MOSFET 310 and the second power MOSFET 320 in the pulse skip mode. In this case, at the first time point T1, the second control signal PWM_LS may have a low level.

The cyclic bootstrap charger 350 may periodically generate the third control signal BTS_CHG for forcibly turning on the second power MOSFET 320, in response to the mode signal SIG_MODE indicating the pulse skip mode. The second gate drive signal GD_LS may be toggled according to the third control signal BTS_CHG which is periodically generated even though the second control signal PWM_LS is logic low based on the pulse skip mode. The cyclic bootstrap charger 350 may toggle the third control signal BTS_CHG by a pre-defined number of times every first cycle $t_{CYC}$. A period in which the third control signal BTS_CHG is toggled by the pre-defined number of times may be referred as a charge period $t_{CHG}$.

According to an embodiment of the inventive concept, when the cyclic bootstrap charger 350 starts to toggle the third control signal BTS_CHG at a second time point T2, the third control signal BTS_CHG may be toggled four times, and the third control signal BTS_CHG may be toggled again at a third time point T3 at which time elapses by the first cycle $t_{CYC}$ from the second time point T2. In other words, the third control signal BTS_CHG may be toggled again after the first cycle $t_{CYC}$ completes. According to an embodiment of the inventive concept, the third control signal BTS_CHG may be toggled in a second cycle (also referred to as switching time) $t_{SW}$. For example, when the third control signal BTS_CHG transitions to "logic high" at the second time point T2, the third control signal BTS_CHG may transition to "logic high" again at a fourth time point T4. In other words, the second cycle $t_{SW}$ may correspond to a time interval between the second time point T2 and the fourth time point T4. According to an embodiment of the inventive concept, the third control signal BTS_CHG may be toggled by the pre-defined number of times and then maintained "logic low" for a discharge period $t_{DISCHG}$. During the discharge period $t_{DISCHG}$, the third control signal BTS_CHG is not applied, and thus, the voltage level VBTS of the bootstrap capacitor 330 may slowly decrease.

According to various embodiments of the inventive concept, the first cycle $t_{CYC}$, the second cycle $t_{SW}$, and the discharge period $t_{DISCHG}$ may be variably controlled based on a capacitance value of the bootstrap capacitor 330 and a leakage current magnitude of the bootstrap capacitor 330. For example, the larger a capacity of the bootstrap capacitor 330, the greater a length of the discharge period $t_{DISCHG}$. As the capacity of the bootstrap capacitor 330 increases, the number of toggles of the third control signal BTS_CHG may increase. As another example, the larger the leakage current of the bootstrap capacitor 330, the less the length of the discharge period $t_{DISCHG}$. As the leakage current of the bootstrap capacitor 330 increases, the number of toggles of the third control signal BTS_CHG may increase.

Figure 5:
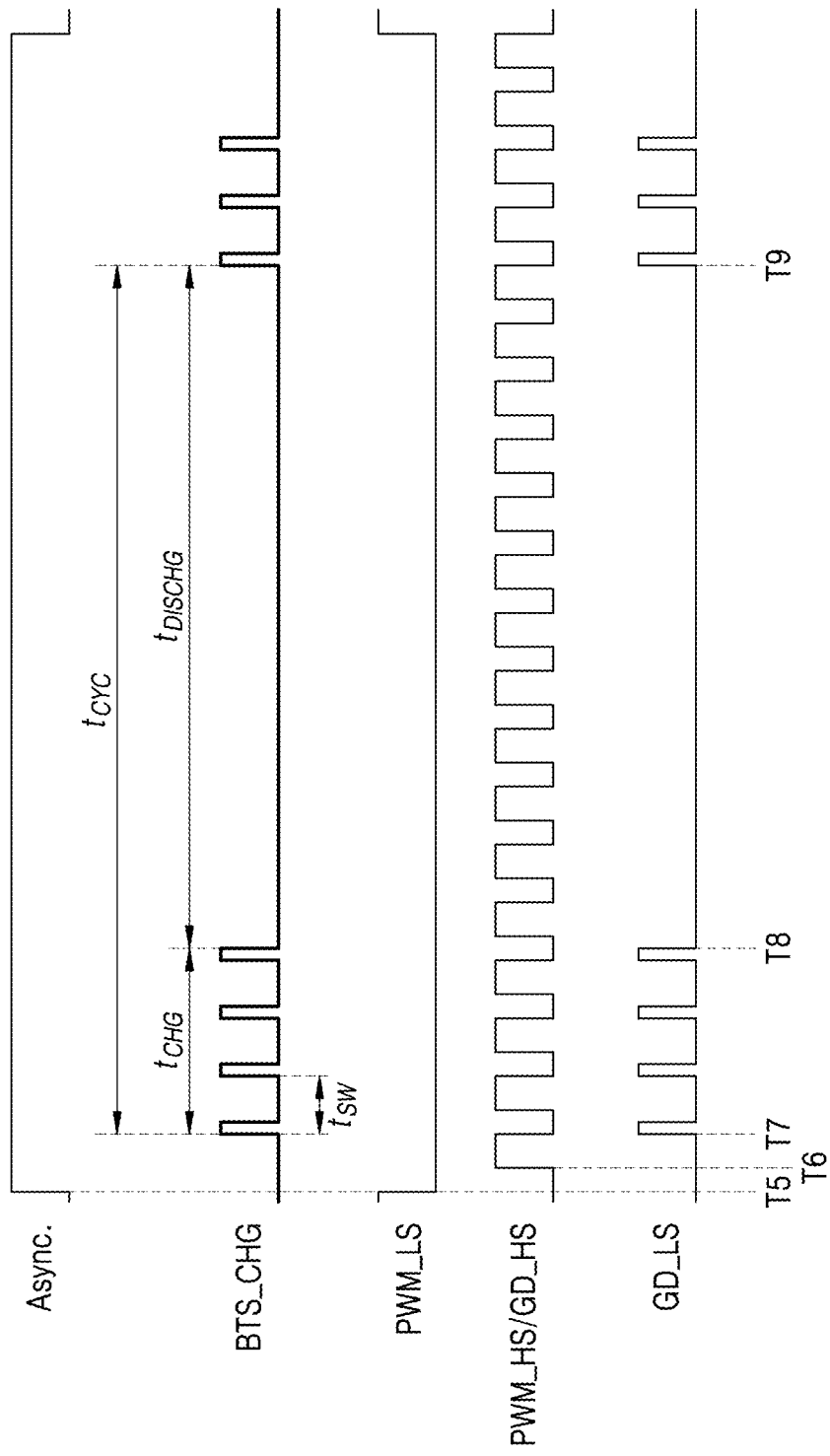
FIG. 5 is a timing diagram illustrating an asynchronous mode according to an example embodiment of the inventive concept.

FIG. 5 is a timing diagram illustrating the asynchronous mode according to an embodiment of the inventive concept.

Referring to FIG. 5, the PWM controller 340 and the cyclic bootstrap charger 350 may enter the asynchronous mode (Async high) at a fifth time point T5. For example, the PWM controller 340 and the cyclic bootstrap charger 350 may receive the mode signal SIG_MODE indicating the asynchronous mode at the fifth time point T5.

The PWM controller 340 may inactivate the second control signal PWM_LS and toggle only the first control signal PWM_HS in response to the mode signal SIG_MODE indicating the asynchronous mode. The cyclic bootstrap charger 350 may toggle the third control signal BTS_CHG in response to the mode signal SIG_MODE indicating the asynchronous mode. The second gate drive signal GD_LS may be toggled according to the third control signal BTS_CHG being toggled based on the asynchronous mode even though the second control signal PWM_LS remains logic low based on the asynchronous mode. According to an embodiment of the inventive concept, the third control signal BTS_CHG may be activated alternately with the first control signal PWM_HS. In other words, the third control signal BTS_CHG may be activated only in a period in which the first control signal PWM_HS is "logic low" during toggling of the first control signal PWM_HS. In other words, the third control signal BTS_CHG may be "logic high" when the first control signal PWM_HS is "logic low" during toggling of the first control signal PWM_HS.

Referring to FIG. 5, the first control signal PWM_HS may be toggled at a sixth time point T6. Periods in which the first control signal PWM_HS is turned on and off may be determined according to a pre-defined PWM ratio. Hereinafter, for convenience of description, it may be assumed that a ratio of a turning-on period to a turning-off period is 1:1 and the first control signal PWM_HS is toggled at every switching time $t_{SW}$.

When the switching time $t_{SW}$ elapses after the first control signal PWM_HS is toggled at the sixth time point T6, the third control signal BTS_CHG may be activated. A length of a time for which the third control signal BTS_CHG is activated may be less than or equal to a length of the switching time $t_{SW}$. This is because a length of a time for which the first control signal PWM_HS is inactivated is the same as the length of the switching time $t_{SW}$. If it is assumed that a time point at which the third control signal BTS_CHG starts to be toggled is a seventh time point T7, the seventh time point T7 may be a time point which elapses by the switching time $t_{SW}$ from the sixth time point T6.

The third control signal BTS_CHG may be toggled by the pre-defined number of times and then maintained "logic low" for the discharge period $t_{DISCHG}$. Because the voltage level VBTS of the bootstrap capacitor 330 is maintained in a proper level according to the toggling of the third control signal BTS_CHG, the toggling of the third control signal BTS_CHG causing noise in a waveform of an inductor current I_IND does not have to be continuously maintained.

The charge period $t_{CHG}$ of the bootstrap capacitor 330 may be a time taken to toggle the third control signal BTS_CHG by the pre-defined number of times. Referring to FIG. 5, the charge period $t_{CHG}$ may include an eighth time point T8 at which the third control signal BTS_CHG transitions to "logic low" after being toggled four times since the seventh time point T7. In addition, the discharge period $t_{DISCHG}$ may include a ninth time point T9 at which the third control signal BTS_CHG starts to be toggled again since the eighth time point T8. A charging cycle $t_{CYC}$ of the bootstrap capacitor 330 may include the charge period $t_{CHG}$ and the discharge period $t_{DISCHG}$.

According to various embodiments of the inventive concept, the charge period $t_{CHG}$ and the discharge period $t_{DISCHG}$ may be variably controlled based on the capacitance value of the bootstrap capacitor 330 and the leakage current magnitude of the bootstrap capacitor 330. For example, the larger the capacity of the bootstrap capacitor 330, the greater the length of the discharge period $t_{DISCHG}$. As the capacity of the bootstrap capacitor 330 increases, the number of toggles of the third control signal BTS_CHG may increase, thereby increasing the charge period $t_{CHG}$. As another example, as the leakage current of the bootstrap capacitor 330 increases, the voltage level VBTS of the bootstrap capacitor 330 may quickly drop, thereby decreasing the length of the discharge period $t_{DISCHG}$. As the leakage current of the bootstrap capacitor 330 increases, an amount of charges discharged while toggling the third control signal BTS_CHG may increase. Therefore, as the leakage current of the bootstrap capacitor 330 increases, the number of toggles of the third control signal BTS_CHG may increase, thereby increasing a length of the charge period $t_{CHG}$. In an example embodiment, the length of the discharge period $t_{DISCHG}$ is determined in proportion to the capacitance value of the bootstrap capacitor 330.

Figure 6:
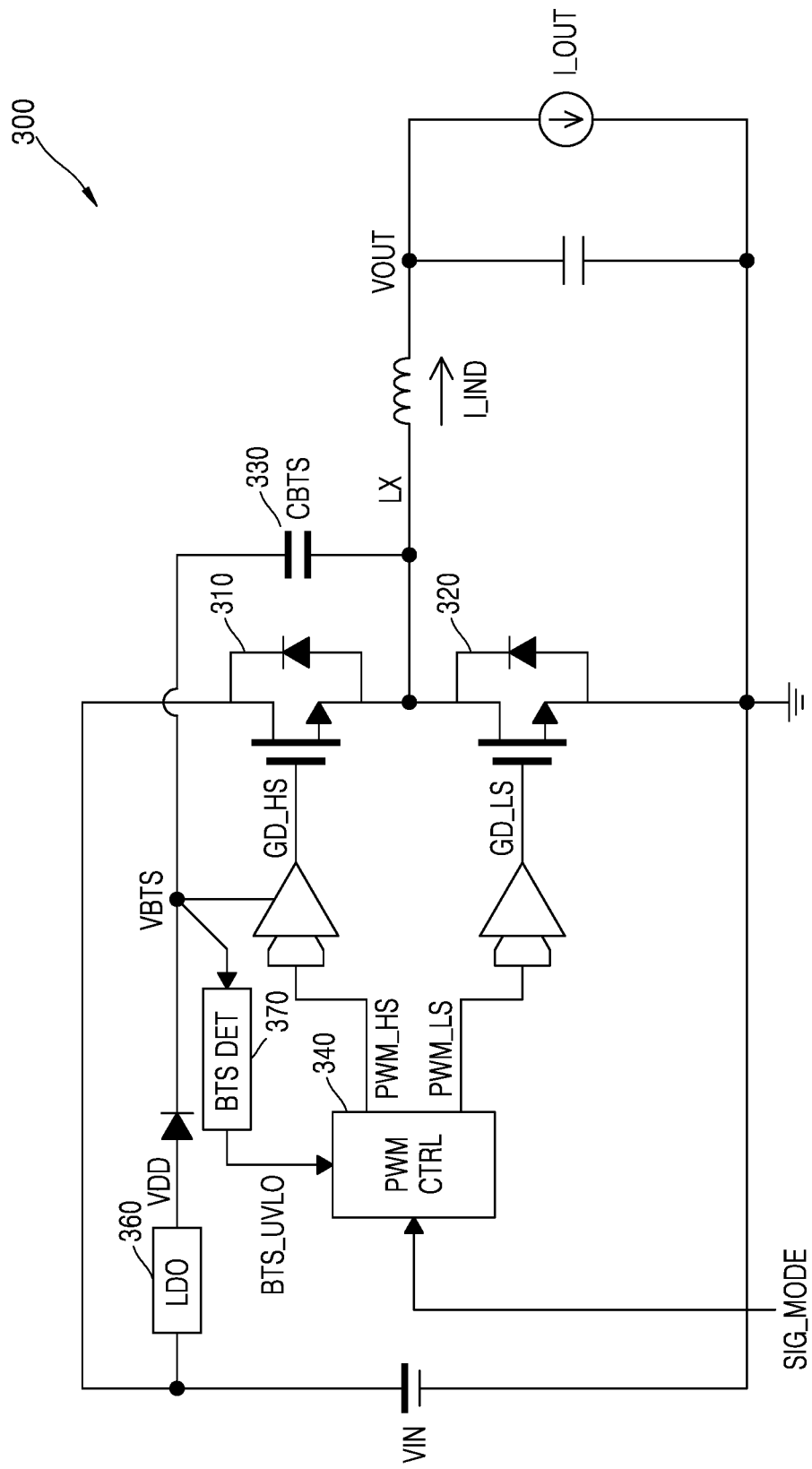
FIG. 6 is a circuit diagram illustrating a buck converter including a bootstrap capacitor, according to a comparative example.

FIG. 6 is a circuit diagram illustrating the buck converter 300 including the bootstrap capacitor 330, according to a comparative example.

Referring to FIG. 6, the buck converter 300 may not include the cyclic bootstrap charger 350. In other words, the buck converter 300 does not generate the third control signal BTS_CHG for turning on the second power MOSFET 320 when receiving the mode signal SIG_MODE indicates the asynchronous mode or the pulse skip mode.

The buck converter 300 of FIG. 6 may further include a bootstrap detection circuit 370. The bootstrap detection circuit 370 may monitor the voltage level VBTS of the bootstrap capacitor 330 and generate a control signal BTS_UVLO by comparing the voltage level VBTS of the bootstrap capacitor 330 with a threshold level. When the PWM controller 340 receives the control signal BTS_UVLO from the bootstrap detection circuit 370, the PWM controller 340 may determine there is a situation in which the voltage level VBTS of the bootstrap capacitor 330 is lower than the threshold level. The PWM controller 340 may perform toggling of the second control signal PWM_LS to charge the bootstrap capacitor 330.

However, the reception of the control signal BTS_UVLO by the PWM controller 340 from the bootstrap detection circuit 370 indicates that the voltage level VBTS of the bootstrap capacitor 330 is already too low, and due to the already too low voltage level of the bootstrap capacitor 330, a protection operation on the charging IC 110 is performed.

Figure 7A:
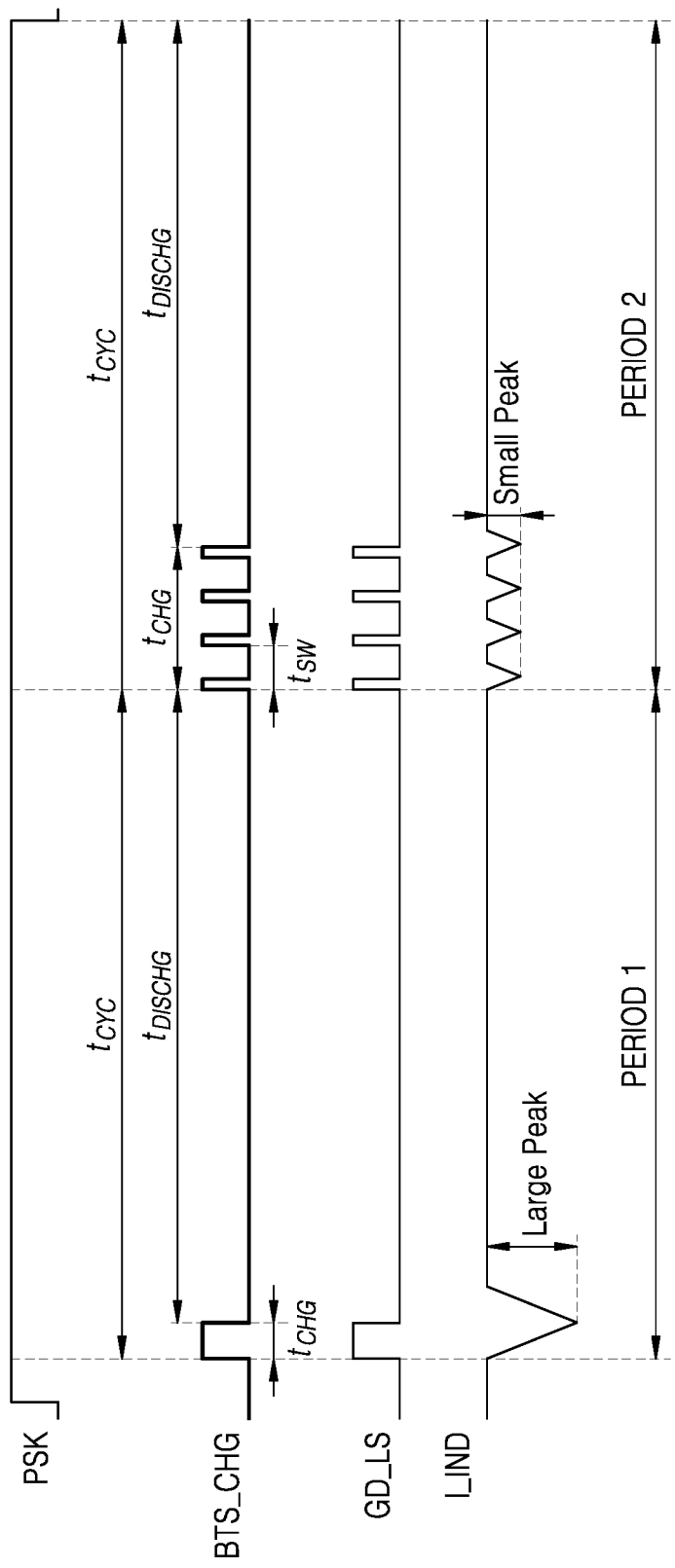
FIG. 7A is a timing diagram illustrating the pulse skip mode according to a comparative example.
Figure 7B:
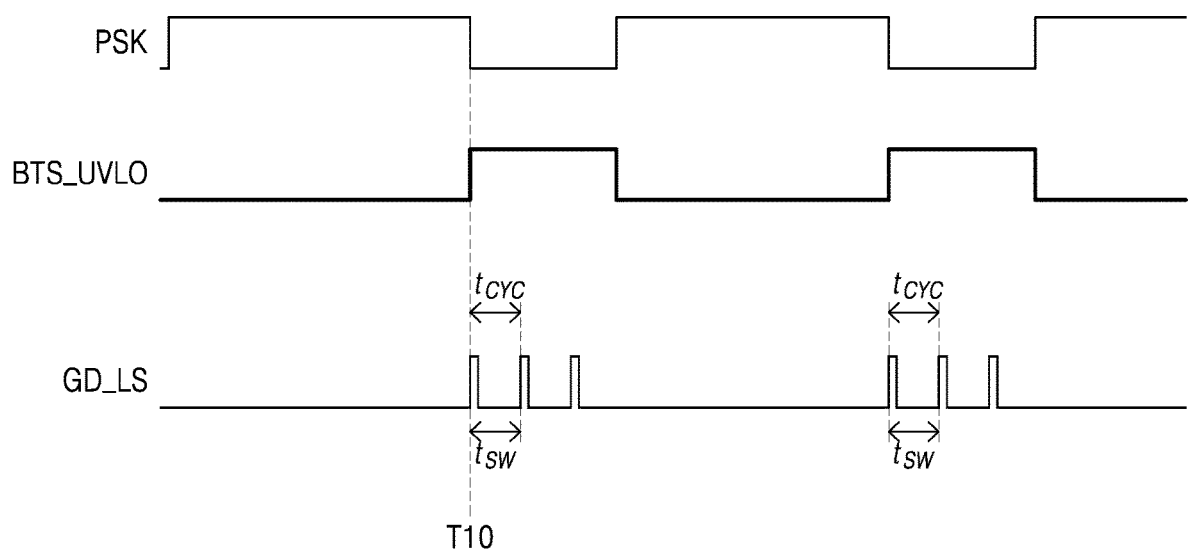
FIG. 7B is a timing diagram illustrating the pulse skip mode according to a comparative example.

FIGS. 7A and 7B are timing diagrams illustrating the pulse skip mode according to comparative examples.

FIG. 7A shows a case where a period for operating in the pulse skip mode is long, and FIG. 7B shows a case where a period for operating in the pulse skip mode is short.

Referring to FIG. 7A, a first period PERIOD 1 may correspond to an operation of the buck converter 300 according to a comparative example. After entering the pulse skip mode, the second control signal PWM_LS for charging the bootstrap capacitor 330 may transition to "logic high" in the first period PERIOD 1. In the first period PERIOD 1, the second control signal PWM_LS may maintain a "logic high" state for a pre-defined charge period $t_{CHG}$ instead of being toggled. When the second control signal PWM_LS maintains being "logic high" for the charge period $t_{CHG}$, a peak value of the inductor current I_IND may be generated to be large.

A second period PERIOD 2 may correspond to an operation of the buck converter 300 according to an example embodiment of the inventive concept. In other words, in the second period PERIOD 2, the second control signal PWM_LS may be toggled while the second power MOSFET 320 is being repeatedly turned-on and off every switching time $t_{SW}$. For example, a total sum of activation times of the second control signal PWM_LS according to toggling four times may be the same as a time of the charge period $t_{CHG}$ of the second control signal PWM_LS in the first period PERIOD 1. Thus, even when the second control signal PWM_LS is applied for the same time, the peak value of the inductor current I_IND may be reduced by controlling the second power MOSFET 320 based on shortly repeated toggle signals.

Referring to FIGS. 6 and 7B, the buck converter 300 according to a comparative example may monitor the voltage level of the bootstrap capacitor 330. For example, the PWM controller 340 may receive the control signal BTS_UVLO from the bootstrap detection circuit 370 at a tenth time point T10. The PWM controller 340 may activate the second control signal PWM_LS for charging the bootstrap capacitor 330, in response to the reception of the control signal BTS_UVLO. Therefore, the PWM controller 340 may inactivate the pulse skip mode for a period of time and toggle the second control signal PWM_LS. In other words, the buck converter 300 according to a comparative example periodically inactivates the pulse skip mode and applies the second control signal PWM_LS to charge the bootstrap capacitor 330, and thus, a magnitude of a ripple component of an output voltage VOUT may be large.

Figure 8:
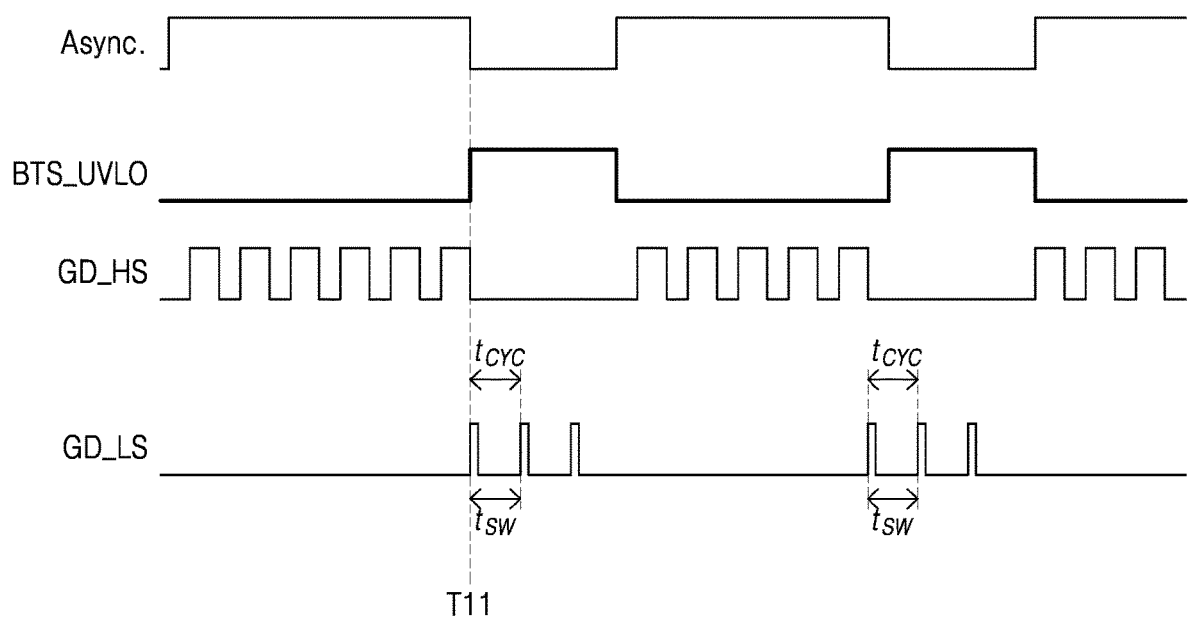
FIG. 8 is a timing diagram illustrating the asynchronous mode according to a comparative example.

FIG. 8 is a timing diagram illustrating the asynchronous mode according to a comparative example.

Referring to FIG. 8, the buck converter 300 according to a comparative example may monitor the voltage level VBTS of the bootstrap capacitor 330 based on the bootstrap detection circuit 370. For example, the PWM controller 340 may receive the control signal BTS_UVLO from the bootstrap detection circuit 370 at an eleventh time point T11. The PWM controller 340 may activate the second control signal PWM_LS for charging the bootstrap capacitor 330, in response to the reception of the control signal BTS_UVLO. Because the asynchronous mode being activated at the eleventh time point T11 is a mode of inactivating the second control signal PWM_LS, the PWM controller 340 may inactivate the asynchronous mode for a period of time and toggle the second control signal PWM_LS. In other words, the buck converter 300 according to a comparative example periodically inactivates the asynchronous mode and applies the second control signal PWM_LS to charge the bootstrap capacitor 330, and thus, a magnitude of a ripple component of the output voltage VOUT may be large.

While the inventive concept has been particularly shown and described with reference to embodiments thereof, it will be understood that various changes in form and details may be made thereto without departing from the spirit and scope of the inventive concept set forth by the following claims.

What is claimed is:

1. A buck converter, comprising:
a first switching element connecting an input voltage node to a switching node;
a second switching element connecting the switching node to a ground node;
a low drop out (LDO) voltage regulator connected to the input voltage node;
a pulse width modulation (PWM) controller configured to receive a mode signal indicating an operation mode and toggle, in response to the mode signal, a first control signal for turning on the first switching element or a second control signal for turning on the second switching element;
a bootstrap charger configured to receive the mode signal and repeatedly switch levels of a third control signal for turning on the second switching element between a high state and a low state while the first control signal and the second control signal are in the low state in a pulse skip mode, and repeatedly switch the levels of the third control signal between the high state and the low state while levels of the first control signal are repeatedly switched between the low state and the high state, respectively, in an asynchronous mode; and
a bootstrap capacitor connecting an output node of the LDO voltage regulator to the switching node.

2. The buck converter of claim 1, wherein the operation mode corresponds to the pulse skip mode,
the PWM controller is further configured to inactivate the first control signal and the second control signal in the pulse skip mode, and
the bootstrap charger is further configured to toggle the third control signal.

3. The buck converter of claim 2, wherein the third control signal is toggled a pre-defined number of times in a charge period and maintains a logic low level in a discharge period after the charge period.

4. The buck converter of claim 3, wherein a length of the charge period, a length of the discharge period, and the pre-defined number of times are determined based on a magnitude of a leakage current of the bootstrap capacitor and a capacitance value of the bootstrap capacitor.

5. The buck converter of claim 1, wherein the operation mode corresponds to the asynchronous mode,
the PWM controller is further configured to inactivate the second control signal in the asynchronous mode.

6. The buck converter of claim 5, wherein the third control signal is toggled a pre-defined number of times in a charge period and maintains a logic low level in a discharge period after the charge period.

7. The buck converter of claim 6, wherein a length of the charge period and a length of the discharge period are determined based on a magnitude of a leakage current of the bootstrap capacitor and a capacitance value of the bootstrap capacitor.

8. The buck converter of claim 7, wherein the length of the charge period is directly proportional to the magnitude of the leakage current of the bootstrap capacitor, and
the length of the discharge period is determined in proportion to the capacitance value of the bootstrap capacitor.

9. An operating method of a buck converter, the operating method comprising:
receiving a mode signal and identifying an operation mode;
toggling, based on the operation mode, a first control signal for turning on a first switching element or a second control signal for turning on a second switching element; and
repeatedly switch levels of a third control signal for turning on the second switching element between a high state and a low state while the first control signal and the second control signal are in the low state in a pulse skip mode, and repeatedly switch the levels of the third control signal between the high state and the low state while levels of the first control signal are repeatedly switched between the low state and the high state, respectively, in an asynchronous mode.

10. The operating method of claim 9, further comprising, when the operation mode corresponds to the pulse skip mode, bypassing the toggling of the first control signal and the second control signal.

11. The operating method of claim 10, wherein the third control signal is toggled a pre-defined number of times in a charge period and inactivated in a discharge period after the charge period.

12. The operating method of claim 11, wherein a length of the charge period, a length of the discharge period, and the pre-defined number of times are determined based on a magnitude of a leakage current of a bootstrap capacitor included in the buck converter and a capacitance value of the bootstrap capacitor.

13. The operating method of claim 9, further comprising, when the operation mode corresponds to the asynchronous mode, inactivating the second control signal.

14. The operating method of claim 13, wherein the third control signal is toggled a pre-defined number of times in a charge period and inactivated in a discharge period after the charge period.

15. The operating method of claim 14, wherein a length of the charge period and a length of the discharge period are determined based on a magnitude of a leakage current of a bootstrap capacitor included in the buck converter and a capacitance value of the bootstrap capacitor.

16. The operating method of claim 15, wherein the length of the charge period is inversely proportional to the magnitude of the leakage current of the bootstrap capacitor, and
the length of the discharge period is determined in proportion to the capacitance value of the bootstrap capacitor.

17. A buck converter, comprising:
a first switching element connecting an input voltage node to a switching node;
a second switching element connecting the switching node to a ground node;
a pulse width modulation (PWM) controller configured to receive a mode signal indicating an operation mode and toggle, in response to the mode signal, a first control signal for turning on the first switching element or a second control signal for turning on the second switching element;

a bootstrap charger configured to receive the mode signal and repeatedly switch levels of a third control signal for turning on the second switching element between a high state and a low state while the first control signal and the second control signal are in the low state in a pulse skip mode, and repeatedly switch the levels of the third control signal between the high state and the low state while levels of the first control signal are repeatedly switched between the low state and the high state, respectively, in an asynchronous mode; and a bootstrap capacitor configured to boost a voltage input to a gate of the first switching element, wherein the bootstrap capacitor is connected to the switching node.

18. The buck converter of claim 17, wherein, when the operation mode corresponds to the pulse skip mode, the PWM controller is further configured to inactivate the first control signal and the second control signal, and the bootstrap charger is further configured to toggle the third control signal, and when the operation mode corresponds to the asynchronous mode, the PWM controller is further configured to inactivate the second control signal.

* * * * *